United States Patent
MacAdam et al.

(10) Patent No.: US 6,642,669 B1
(45) Date of Patent: Nov. 4, 2003

(54) ELECTRONIC DIMMING BALLAST FOR COMPACT FLUORESCENT LAMPS

(75) Inventors: Russell L. MacAdam, Coopersburg, PA (US); Andrew Ryan Offenbacher, Quakertown, PA (US); Jecko J. Arakkal, Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 10/160,546

(22) Filed: Jun. 1, 2002

(51) Int. Cl.[7] .............................................. H05B 37/02
(52) U.S. Cl. ................... 315/244; 315/224; 315/DIG. 4
(58) Field of Search ................................. 315/244, 224, 315/DIG. 4, DIG. 5

(56) References Cited

U.S. PATENT DOCUMENTS

| | | | |
|---|---|---|---|
| 5,041,763 A | 8/1991 | Sullivan et al. | ............. 315/176 |
| 5,041,763 A | 6/1996 | Sullivan et al. | ............. 315/176 |
| 5,841,239 A | 11/1998 | Sullivan et al. | ............. 315/219 |
| 5,864,212 A | * 1/1999 | Sullivan | ..................... 315/205 |
| 6,111,368 A | 8/2000 | Luchaco | ..................... 315/307 |
| 6,225,760 B1 | 5/2001 | Moan | ......................... 315/360 |

* cited by examiner

*Primary Examiner*—David Vu
(74) *Attorney, Agent, or Firm*—Woodcock Wshburn LLP (57) ABSTRACT

The operating frequency of a ballast is sufficiently far from resonance that, when a compact fluorescent lamp is dimmed to about one percent light output level, the ballast is operating with an open loop gain below a predetermined level, such as, for example, 15, and is operating with an output impedance greater than a predetermined level, such as, for example, the absolute value of the maximum negative incremental impedance of the lamp, and more preferably, greater than twice the absolute value of the maximum negative incremental impedance of the lamp. By changing the frequency to 85 kHz from 80 kHz, for example, the gain is maintained about the same whether the light output is at five percent or one percent, for example. This provides a stable control loop. In this manner, compact fluorescent lamps can be dimmed below about one percent light output, without dropping out and without observable flicker.

18 Claims, 8 Drawing Sheets

ELECTRONIC DIMMING BALLAST FOR COMPACT FLUORESCENT LAMPS

FIELD OF THE INVENTION

The present invention relates in general to dimming gas discharge lamps and, more particularly, to electronic dimming ballasts for dimming compact fluorescent lamps.

BACKGROUND OF THE INVENTION

A gas discharge lamp converts electrical energy into visible light with high efficiency. A gas discharge lamp is generally an elongated gas-filled (usually low-pressure mercury vapor) tube having electrodes at each end. Each electrode is typically formed from a resistive filament (usually tungsten) coated with a thermionically emissive material, such as a mixture of alkaline earth oxides.

The steady-state operation of a typical gas discharge lamp is as follows. Voltage is applied across the resistive filaments, heating the electrodes to a temperature sufficient to cause thermionic emission of electrons into the discharge tube. A voltage applied between the electrodes accelerates the electrons toward the anode. En route to the anode, the electrons collide with gas atoms to produce positive ions and additional electrons, forming in the tube a gas plasma of positive and negative charge carriers. The electrons continue to stream toward the anode and the positive ions toward the cathode, sustaining an electric discharge in the tube and further heating the electrodes. If the applied power is AC, the electrodes reverse polarity each half cycle.

The discharge causes the emission of radiation having a wavelength dependent upon the particular fill gas and the electrical parameters of the discharge. Because each collision produces additional electrons and ions, increases in the arc current cause the impedance of the lamp to decrease, a characteristic known as "negative incremental impedance." Operation of the lamp is inherently unstable, due to this negative incremental impedance characteristic, and thus the current between the electrodes must be controlled to provide stable operation of the lamp.

Gas discharge lamps, including fluorescent lamps, are designed to deliver their full rated, or "nominal", light output at a specified RMS lamp current value. In this specification and the attached claims, the full rated light output of a lamp will be referred to as its "nominal light output".

Fluorescent gas discharge lamps include a phosphor coating on the inside surface of the tubular glass housing, and the excitation of this coating by radiation from the discharge provides the visible light output. Conventional fluorescent lamps are generally straight elongated tubes of essentially circular cross section with varying outside diameters ranging between about five-eighths and one and one-half inches.

Compact fluorescent lamps differ from conventional fluorescent lamps in that they are constructed of smaller diameter tubing, typically having an outside diameter of less than about five-eighths of an inch. Also, the lamps are compact in part because the tubing has one or more small radius bends that allow the tube to fold back on itself in such a manner as to achieve a compact shape. Additionally, in compact fluorescent lamps wherein the tube is folded back on itself, the lamp ends typically are in close proximity to each other.

Figure 1:
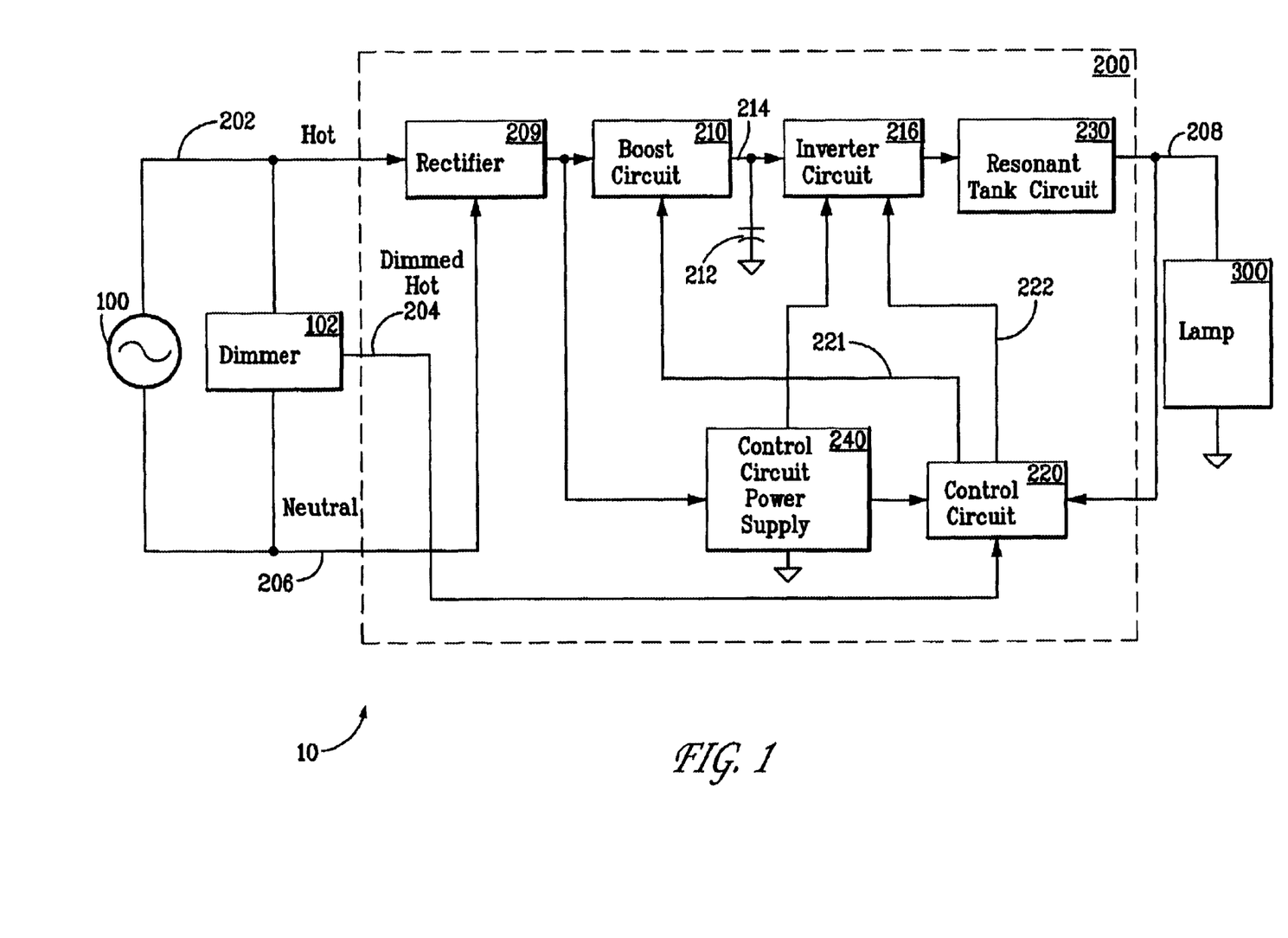
FIG. 1 is a high-level block diagram of a fluorescent lamp system of the prior art.

With reference to FIG. 1, a prior art lamp system 10 includes a source of AC power such as from a 120 volt 60 Hz. sinusoidal line voltage 100, a phase controlled dimmer 102, an electronic dimmable fluorescent ballast 200, and a compact fluorescent lamp 300.

The ballast 200 receives input power (or hot) on line 202, a variable input dimming signal (or dimmed hot) on line 204, and neutral on line 206. It is understood that the voltage on line 202 is rectified by a full wave bridge rectifier 209 within the ballast 200 to yield a voltage having a positive DC average value with respect to circuit common.

The electronic dimming ballast 200 is designed to provide an amount of output power to the lamp 300 in accordance with the variable input signal on line 204 from the dimmer 102. The dimmer 102 is a phase control dimmer which provides the variable input signal on line 204 by varying its phase firing angle which controls the RMS value of the variable input signal on line 204.

As is known in the art, the ballast 200 typically includes a first power stage comprising a boost circuit 210 which receives a rectified voltage from rectifier 209 and produces a high DC voltage on line 214 which may reach 400 VDC or more.

The ballast 200 also typically includes a second power stage comprising an inverter circuit 216 which converts the DC voltage on line 214 into a high frequency switched voltage which is applied to a resonant tank circuit 230 which provides suitable AC voltage to drive the lamp 300. A high voltage energy storage capacitor 212 is provided in a shunt configuration with respect to line 214 to provide a low impedance source of current to the inverter circuit 216.

A control circuit 220 provides control signals to the boost circuit 210 and inverter circuit 216 over lines 221 and 222, respectively. The control circuit 220 controls the boost circuit 210 to provide a desired DC bus voltage and controls the inverter circuit 216 to provide the high frequency switched voltage to the resonant tank circuit 230. As a result, the ballast provides the desired current and voltage over line 208 to the lamp 300 responsive to the variable voltage input signal on line 204 such that the lamp 300 is illuminated at the proper intensity.

The control circuit 220 typically controls the inverter 216, for example, by comparing a rectified version of the variable input signal on line 204 with a signal representative of the current delivered to the lamp over line 208 and (via known error signal techniques) adjusting the control signals input to the inverter 216 over line 222 to command the proper current to the lamp 300.

As is known in the art, the control circuit 220 also commands the boost circuit 210 to produce the proper DC output voltage on line 214. Further, the control circuit 220 typically includes circuits which perform other functions such as low voltage lockout, over-current protection, over-voltage protection and the like.

In the embodiment shown in FIG. 1, power is provided by a control circuit power supply 240 to drive the control circuit 220, boost circuit 210, and inverter circuit 216. It is understood that the control circuit power supply 240 may be implemented using many circuit configurations.

The lamp system 10 of FIG. 1 requires three wires between the dimmer 102 and the ballast 200, and the ballast 200 may be located in the light fixture itself. Systems have been developed which eliminate the need for a third terminal on the ballast 200 for receiving the variable input signal on line 204. In these systems, the variable input signal is received on line 202. Other systems have been developed which utilize a third and a fourth terminal on the ballast 200 for receiving the variable input signal.

Ordinarily, when dimming linear fluorescent lamps down to low levels of light output (e.g., about one percent light output level), it is necessary to increase the output impedance of the electronic dimming ballast to maintain stable lamp operation and prevent visible flicker. Typically, the ballast output impedance is increased by driving the frequency of operation of the ballast close to the unloaded resonant frequency of the resonant tank circuit. The need for, and an apparatus and method for, obtaining high ballast output impedance is taught in U.S. Pat. No. B1 5,041,763, the entirety of which is hereby incorporated by reference.

In addition, the inventors have discovered that compact fluorescent lamps, in comparison to typical linear fluorescent lamps, have an additional area of lamp instability at low levels of lamp current around one percent of nominal light output. This additional region of instability manifests itself as a propensity for the lamp light output to extinguish, or "drop out", as opposed to flickering between various low light levels as observed in linear fluorescent lamps. While this phenomena is not fully understood, it is believed that it is related to the physical characteristics of the compact fluorescent lamp, such as the small lamp tube diameter, and the number of and small radii of the lamp bends.

Accordingly, there is a need in the art for a ballast circuit that is capable of maintaining a stable, flicker-free dimming range below about one percent of full light output for compact fluorescent lamps.

SUMMARY OF THE PRESENT INVENTION

To overcome the drawbacks of the prior art ballast circuits, the present invention is directed to systems and methods for dimming a compact fluorescent lamp comprising a ballast of the type including an inverter circuit having a frequency of operation driving a resonant output tank circuit having a predetermined unloaded resonant frequency. The frequency of operation of the inverter circuit is selected such that the open loop system gain is below a first predetermined level (e.g., below about 15) and the ballast output impedance is above a second predetermined level (e.g., above about twice the absolute value of the maximum negative incremental lamp impedance).

According to aspects of the invention, the frequency of operation of the inverter circuit is determined by a control circuit comprising a frequency-determining resistor-capacitor (RC) network. The component values of the RC network are chosen such that the frequency of operation of the inverter circuit, at a lamp output of less than about one percent of nominal light output, is a predetermined function of the resonant frequency of the unloaded resonant tank circuit.

For purposes of this specification and the appended claims, the term "DC" refers to a voltage or current waveform that is unidirectional and can be either pulsating or non-pulsating. The term "AC" refers to a voltage or current waveform that reverses polarity at regularly recurring intervals of time and has alternately positive and negative values. The term "DC component" refers to the average value of an AC or DC waveform. The term "AC component" refers to that portion of an AC or DC waveform remaining after its DC component has been subtracted.

The foregoing and other aspects of the present invention will become apparent from the following detailed description of the invention when considered in conjunction with the accompanying drawings.

BRIEF DESCRIPTION OF THE DRAWINGS

For the purpose of illustrating the invention, there is shown in the drawings an embodiment that is presently preferred, it being understood, however, that the invention is not limited to the specific methods and instrumentalities disclosed. In the drawings.

DESCRIPTION OF EXEMPLARY EMBODIMENTS AND BEST MODE

Lamp light output stability is generally related to the quality of the current source used to operate the lamp. Current source quality is described numerically by a quantity called its output impedance. Output impedance is defined as the ratio of the change in RMS output voltage divided by the corresponding change in RMS output current, and has the units of ohms. Therefore, a current source which exhibits a change in current level of 0.001 amperes as a result of a change in output voltage of one volt would have an output impedance of one volt divided by 0.001 amperes or 1,000 ohms.

Figure 2:
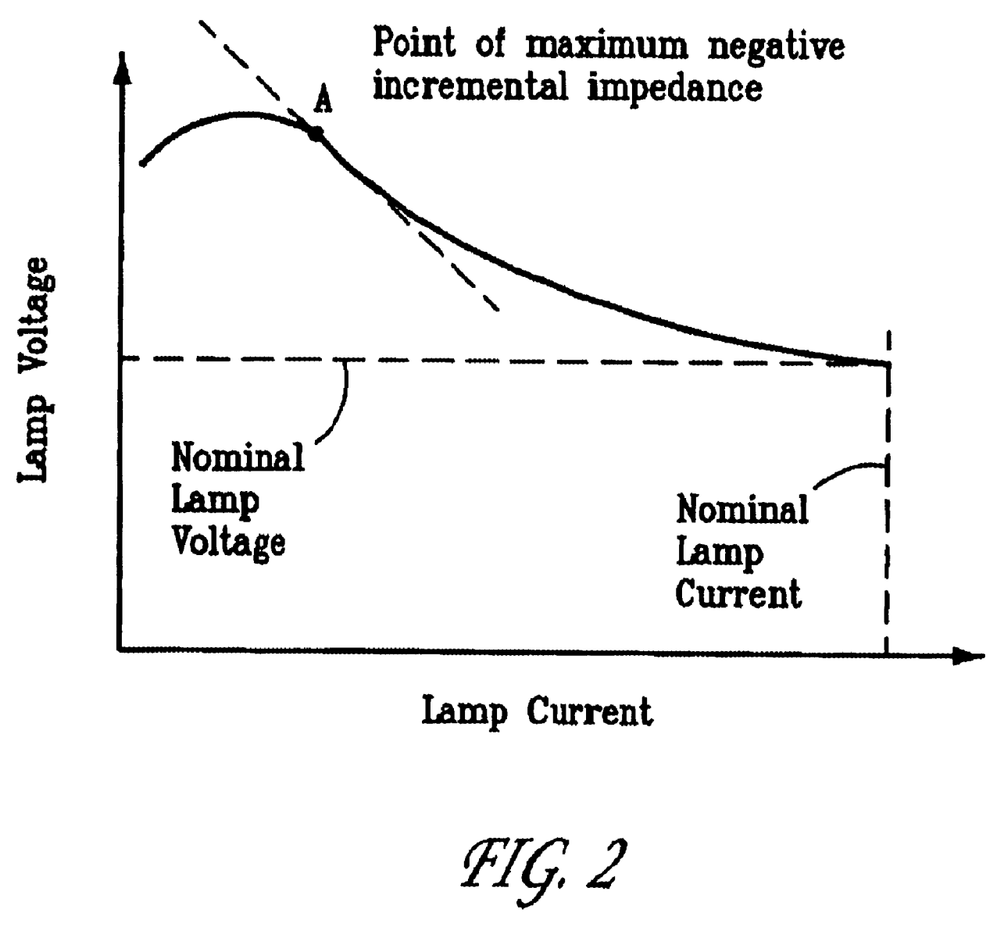
FIG. 2 is a voltage/current characteristic curve for a typical fluorescent lamp.

FIG. 2 is a plot of the voltage/current characteristic of a typical fluorescent lamp. The lamp incremental impedance at any operating point on this curve is defined as the slope of the curve at that point. From this, one can see that the lamp incremental impedance is positive at very low currents, then becomes zero at a maximum voltage point, and goes rapidly negative as current increases still further. Clearly, there exists a point at which the lamp incremental impedance achieves its maximum negative value, and this point is marked A in FIG. 2. The point of maximum negative incremental impedance is the operating point where the lamp is least stable and most likely to exhibit variations in arc current and light output. Therefore, measurements of circuit output impedance should be taken at the point of maximum negative incremental impedance of the lamps, to be a proper indicator of lamp operating stability.

Figure 3A:
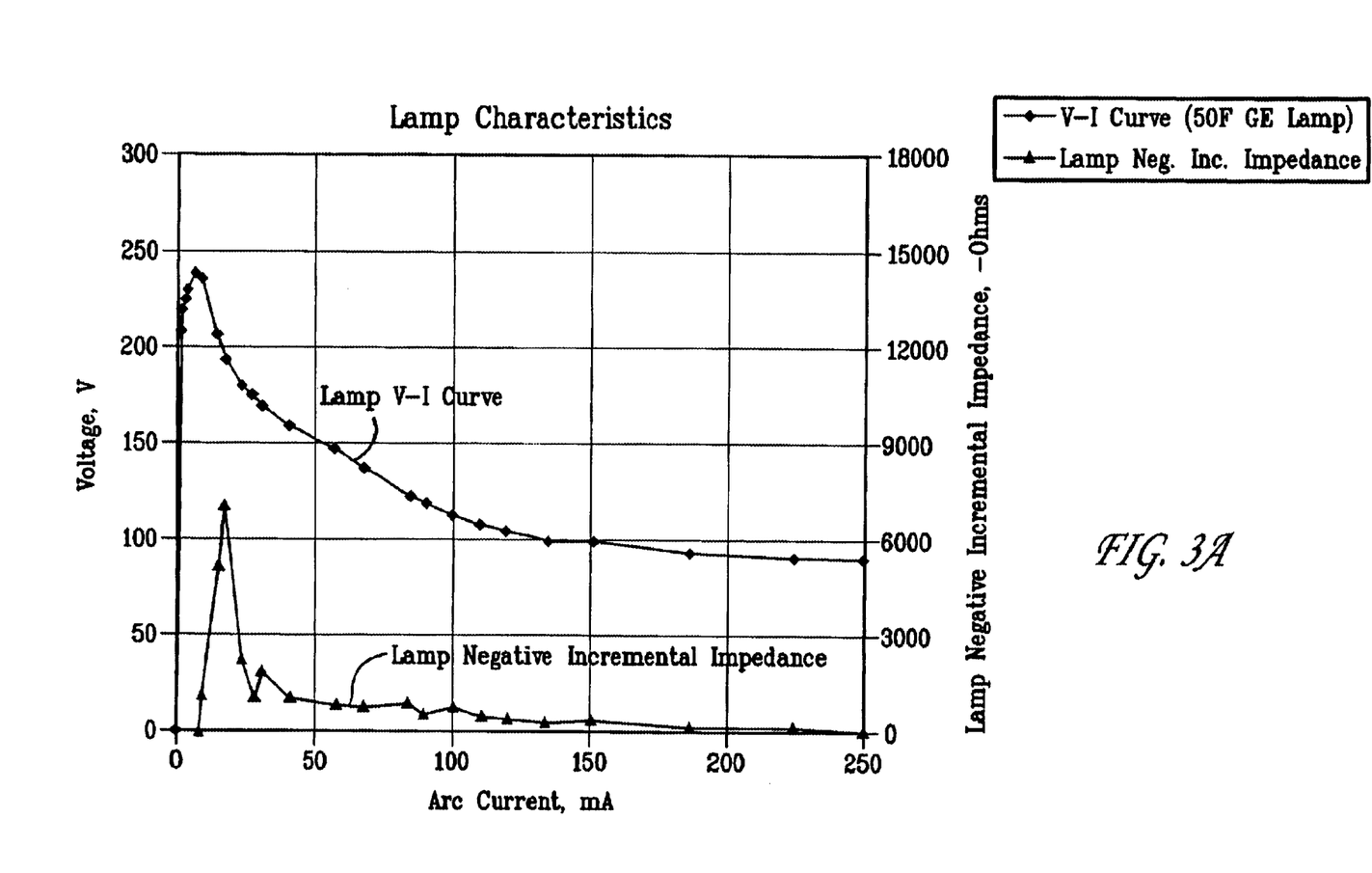
FIG. 3A is a chart showing an exemplary lamp V-I curve and lamp negative incremental impedance curve in accordance with the present invention.
Figure 3B:
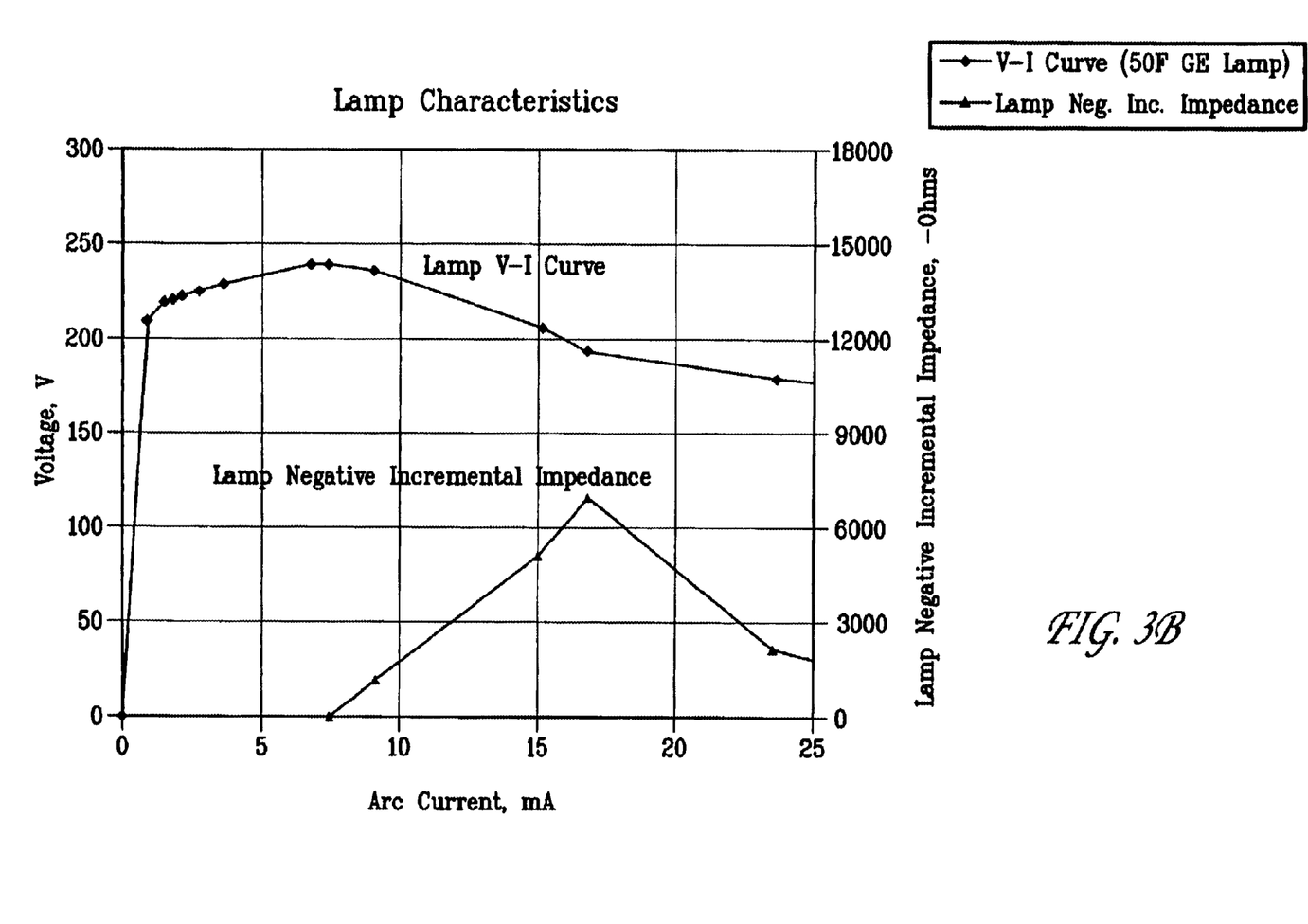
FIG. 3B is an enlarged plot of the section of the chart of FIG. 3A illustrating the V-I characteristic of a typical compact fluorescent lamp at very low lamp current levels.

A chart showing a fluorescent lamp V-I curve and lamp negative incremental impedance for an exemplary lamp in accordance with the present invention is shown in FIGS. 3A and 3B. For a compact fluorescent lamp operating at less than about one percent nominal light output, instability is observed not only at the peak of the negative incremental impedance, as expected, but is also observed for lamp current levels below the peak of the V-I curve.

As shown in greater detail in FIG. 3B, the V-I curve for a typical compact fluorescent lamp exhibits a steep slope forming a "cliff" for which the lamp voltage falls rapidly from the peak of the curve to a zero value for an incrementally small decrease in the lamp current as the lamp is dimmed to below about one percent of nominal light output. In other words, the lamp tends to "drop out", that is, extinguishes, as one attempts to reduce lamp current to levels corresponding to a light output level below about one percent nominal light output. Accordingly, it is desirable to reduce the lamp current level as low as possible without "falling off of the cliff", that is, operating in the region of steep positive slope below the peak since this is the region wherein the lamp is most sensitive to system perturbations which causes drop outs and lamp flickering. The present invention, as described in detail below, provides an apparatus and method for operating a compact fluorescent lamp at low current levels without "falling off of the cliff", that is, without the lamp extinguishing or flickering.

Figure 4:
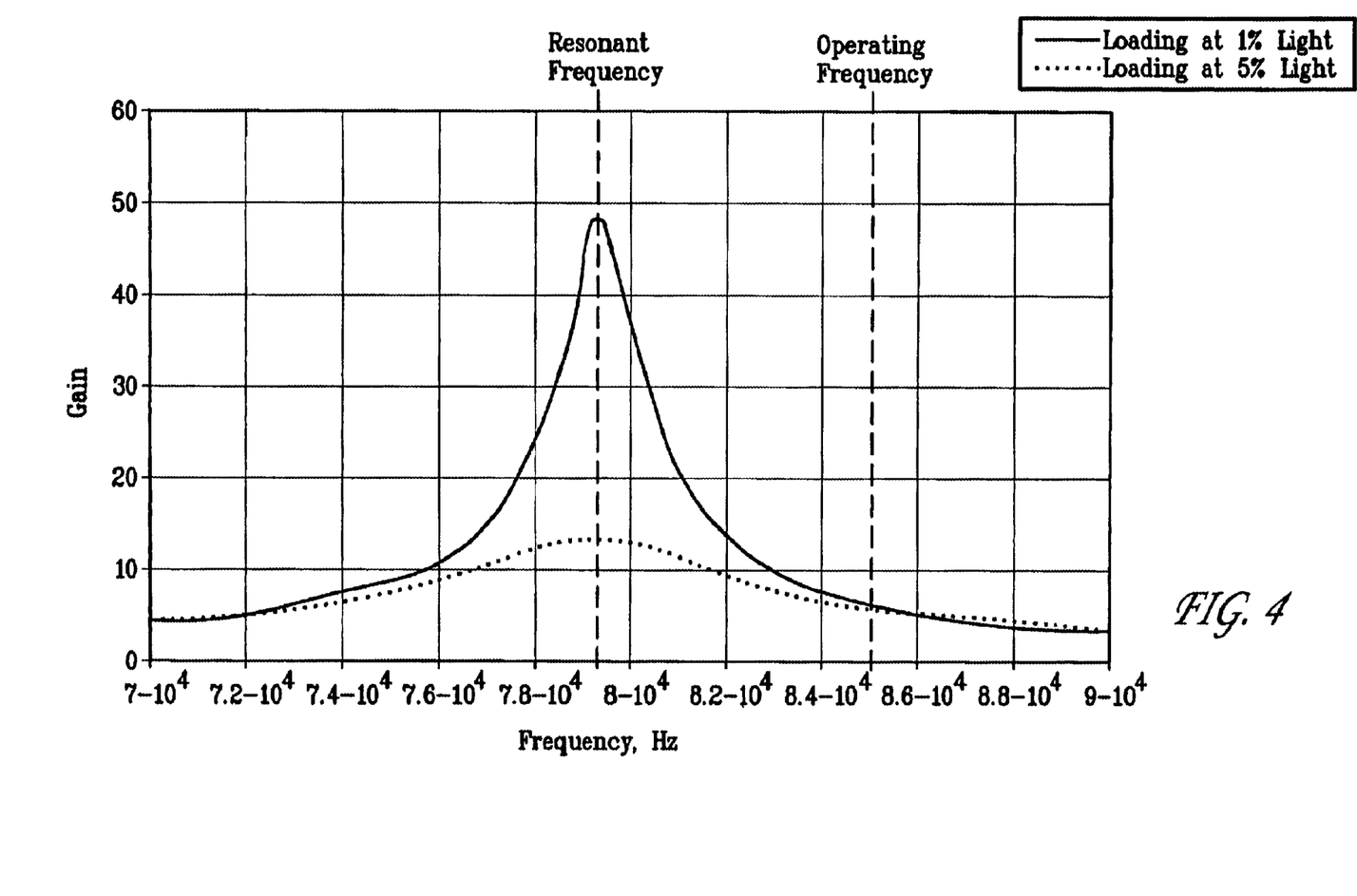
FIG. 4 is a diagram showing gain versus frequency that is useful in describing an exemplary system in accordance with the present invention.

FIG. 4 is a diagram showing ballast system open loop gain versus frequency that is useful in describing exemplary systems and methods in accordance with the present invention. In order to improve stability, conventionally, ballasts are operated as close to resonance as possible. Ordinarily, when dimming linear fluorescent lamps down to low levels of light output (e.g., less than about one percent of nominal light output), it is necessary to increase the output impedance of the ballast to maintain stable lamp operation. Typically, the ballast output impedance is increased by driving the frequency of operation of the ballast as close to resonance as possible.

As shown in FIG. 4, the unloaded resonant frequency of a resonant tank circuit of an exemplary ballast is about 80 kHz. For a compact fluorescent lamp, however, at such a frequency of operation of the ballast, the open loop gain of the ballast greatly increases as the fluorescent lamp is dimmed down to a low level of light output. For example, for one such ballast and compact fluorescent lamp, the inventors have found that below about four percent of nominal light output, the system gain starts rising quickly as a result of the decreasing load that the compact fluorescent lamp presents to the resonant tank circuit. The high gain makes it difficult to create a stable closed loop controller. In FIG. 4, for example, at the resonant frequency, the gain is very high at one percent nominal light output relative to the gain at five percent nominal light output. As a result, the lamp output current becomes very sensitive to even the slightest perturbations.

Additionally, compact fluorescent lamps have a tendency to drop out, as described above, and therefore are much more difficult to keep operating at low light output levels as compared to linear fluorescent lamps.

According to the present invention, to reduce the gain, the operating frequency of the ballast is selected to be sufficiently far from resonance such that, when operating the lamp at about one percent of nominal light output level, the ballast is operating with an open loop gain below a predetermined level, such as, for example, 15. By changing the frequency to 85 kHz from 80 kHz, for example, the gain is approximately the same whether the light output is at five percent or one percent, for example. This provides for a stable control loop.

However, the operating frequency must not be raised so high that the output impedance of the ballast falls below a predetermined level (i.e., the output impedance of the ballast should be kept above a predetermined output impedance, such as, for example, the absolute value of the maximum negative incremental lamp impedance). By operating within this range of frequencies, compact fluorescent lamps can be dimmed below about one percent light output, without dropping out and without flicker.

Preferably, an exemplary ballast for dimming compact fluorescent lamps below about one percent light output of the type including a resonant output tank circuit having a predetermined unloaded resonant frequency, comprises means for selecting a frequency of operation such that the open loop system gain is below a first predetermined level (about 15) and the ballast output impedance is above a second predetermined level (about twice the absolute value of the maximum negative incremental lamp impedance, but at least more than the absolute value of the maximum negative incremental impedance of the lamp). The means for selecting preferably comprises an oscillator having a frequency-determining RC network with component values chosen such that the frequency of operation at a lamp light output of at or below about one percent of nominal light output is a predetermined function of the resonant frequency of the unloaded resonant tank.

The open loop system gain is defined as the ratio of the resonant tank circuit output voltage to the resonant tank circuit input voltage.

Figure 5:
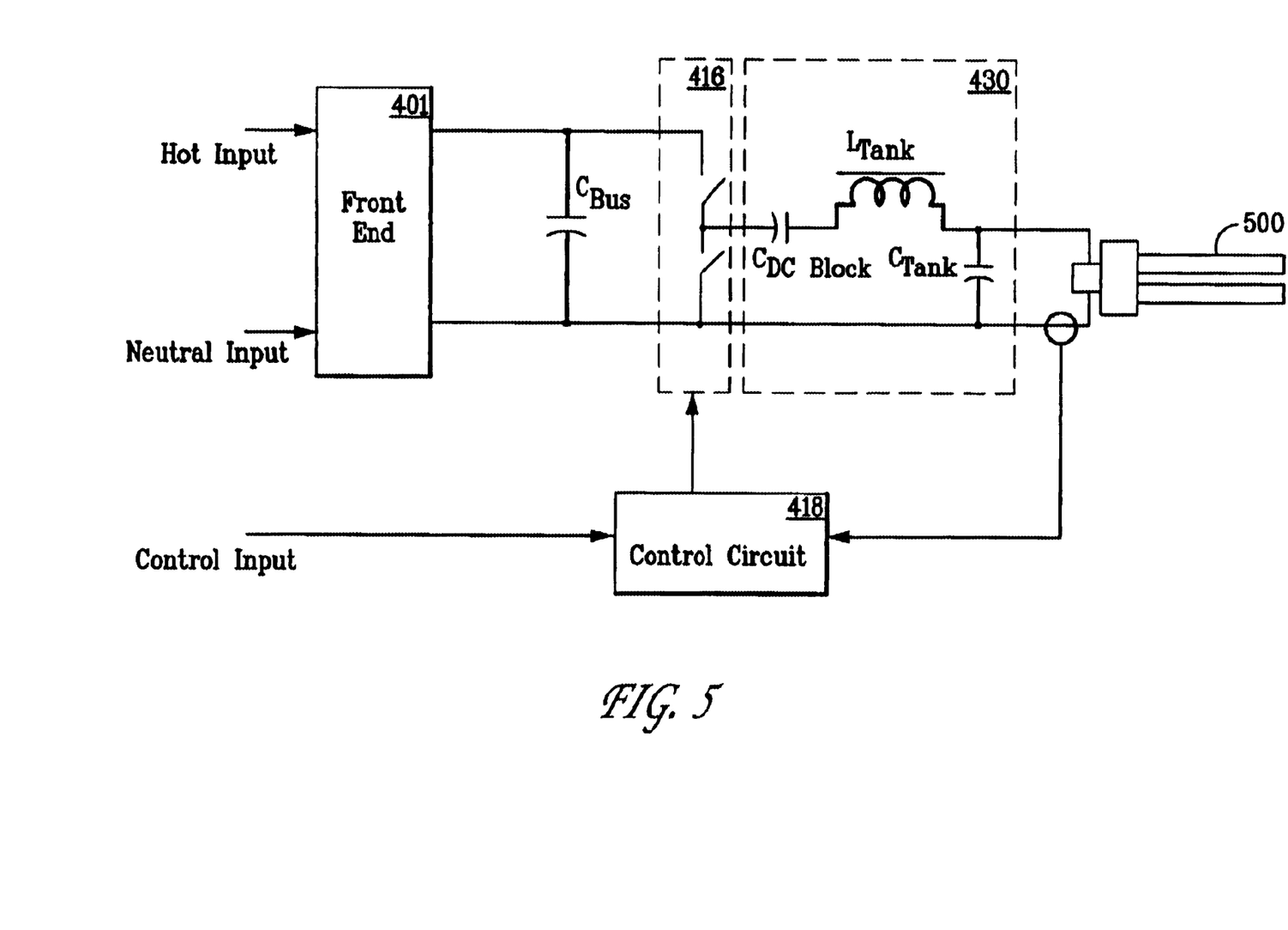
FIG. 5 is a high-level block diagram of an exemplary system in accordance with the present invention.

Referring now to the drawings of the exemplary embodiments wherein like numerals indicate like elements, FIG. 5 is a high-level block diagram of an exemplary system in accordance with the present invention. The system provides a variable amount of power from a sinusoidal power source to a compact fluorescent lamp 500. In FIG. 5, a hot input and neutral input are provided to a front end 401. The system generally includes a front end 401 to convert in a known manner an AC input voltage from a power source into a DC bus voltage stored on a bus capacitor Cbus.

The output of the front end 401, via the capacitor Cbus, is provided to an inverter circuit 416 which provides a high frequency switched AC voltage to a resonant tank circuit 430. More particularly, the inverter 416 is oscillator controlled and switches in a known manner with complementary duty cycle of operation in a D/1-D fashion where D is the duty cycle of operation, thereby driving the resonant tank circuit 430 with a pulse width modulated waveform.

The resonant tank circuit 430 may include a DC blocking capacitor Cblock, a resonant inductor Ltank, and a resonant capacitor Ctank. The resonant tank circuit 430 converts the pulse width modulated waveform from the inverter circuit 416 into a high frequency AC voltage for driving the lamp 500. A control circuit 418 compares an input representative of the current through the lamp with an input dimming control signal representative of a desired light output level to control the current through the lamp by adjusting the frequency of operation and duty cycle of the inverter 416. The current from resonant tank circuit 430 is provided to lamp 500 to strike and maintain a stable electric discharge over a range of selectable power levels. The control circuit 418 is described in further detail below.

Figure 6:
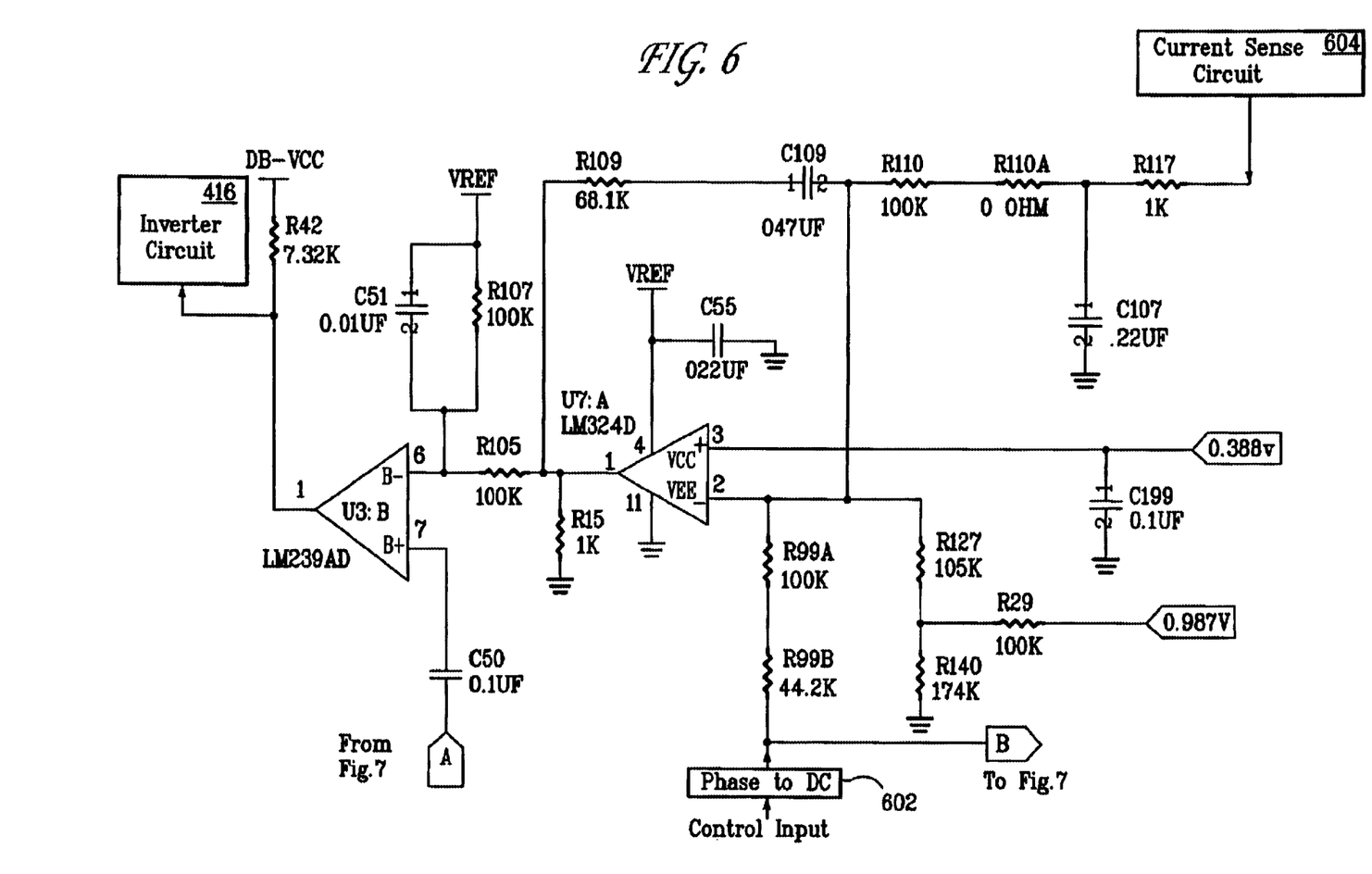
FIG. 6 is a schematic diagram of a portion of the control circuit of FIG. 5.

In FIG. 6, there is shown a portion of the control circuit 418 including a current feedback circuit. An operational amplifier U7:A is configured as an integrator that integrates the difference between a desired light level signal from a phase-to-DC circuit 602 and a signal from a lamp current sense circuit 604. The phase-to DC circuit 602 accepts an input control signal from the control input and converts it into a DC level representative of the desired light level output. The lamp current sense circuit 604 provides a signal representative of the lamp current in a well known fashion. The output of the integrator is compared to the output from an oscillator 702 (FIG. 7) by comparator U3:B to produce a pulse width modulated waveform that drives the switches in the half-bridge inverter circuit 416 of FIG. 5.

Figure 7:
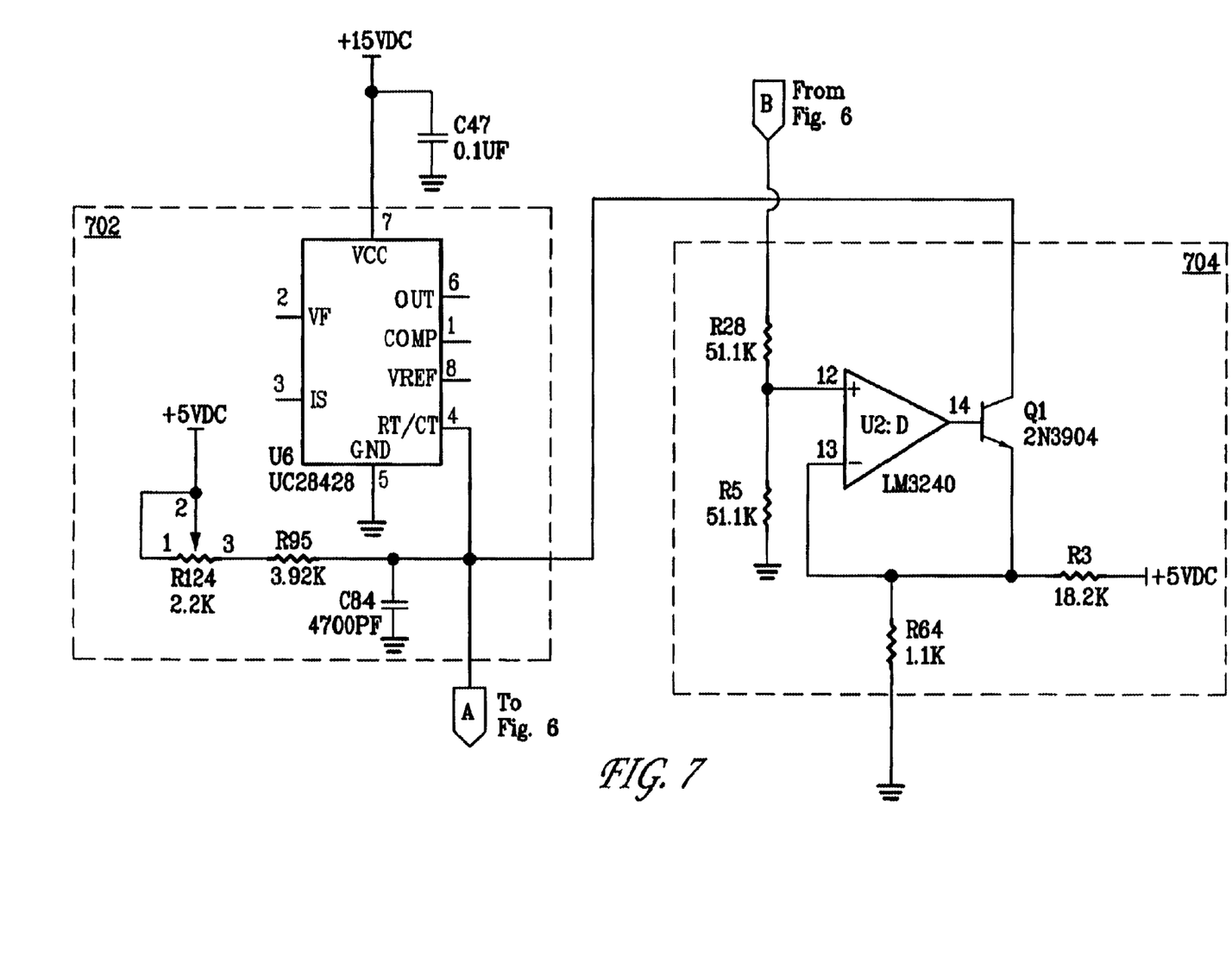
FIG. 7 is a schematic diagram of a further portion of the control circuit of FIG. 5.

FIG. 7 shows a further portion of the control circuit 418 of FIG. 5, including the oscillator 702 that controls the frequency of operation of the ballast. The oscillator 702 includes a portion of integrated circuit U6, resistors R95, R124, and capacitor C84. The frequency of the oscillator at low light output levels is determined by the values of resistors R95, R124, and capacitor C84. Capacitor C84 charges through resistors R95 and R124. When it reaches a value determined by integrated circuit U6, the integrated circuit U6 discharges the capacitor C84.

Control circuit 418 further includes a frequency shift circuit 704 for changing the operating frequency of the oscillator by changing the charging current available to C84 from the resistors R95 and R124, at higher desired light output levels.

The phase-to-DC circuit 602 supplies the desired light level signal, which is a voltage proportional to the dimmer control input, to resistor R28. When the voltage applied to the non-inverting input of U2:D by the voltage divider formed by resistors R5 and R28 is lower than the voltage at the inverting input of U2:D applied by the voltage divider of resistors R3 and R64 (near the low end of the dimming range), the output of U2:D is low, and transistor Q1 is off. The frequency of operation is then determined by the values of resistors R95 and R124, and the capacitor C84. As the desired light level signal from the phase-to-DC circuit 602 increases, the voltage applied to the non-inverting input of U2:D increases thereby causing the output of U2:D to increase, thereby turning on transistor Q1 so as to draw a current out of the oscillator proportional to the desired light level signal. Drawing current out of the oscillator reduces the frequency of operation of the ballast for operating the ballast at high light output levels.

Although the present invention is described for use with compact fluorescent lamps, the circuit herein described may control any type of gas discharge lamp. Since certain changes may be made in the above described circuit without departing from the scope of the invention herein involved, it is intended that all matter contained in the above description or shown in the accompanying drawings shall be interpreted in an illustrative and not a limiting sense.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. An electronic dimming ballast for dimming a compact fluorescent lamp having a maximum negative incremental impedance, said electronic dimming ballast having an open loop system gain and an output impedance comprising:
   an inverter having an output and a frequency of operation;
   a resonant tank circuit connected to the output of the inverter; and
   a control circuit to control the frequency of operation of the inverter such that the open loop system gain is less than a first predetermined level and the ballast output impedance is greater than a second predetermined level so that said ballast is capable of operating said compact fluorescent lamp below about one percent nominal light output without observable flicker.

2. The electronic dimming ballast of claim 1, wherein the first predetermined level is about 15.

3. The electronic dimming ballast of claim 1, wherein the first predetermined level is determined to be approximately equal to the open loop system gain at about five percent nominal light output.

4. The electronic dimming ballast of claim 1, wherein the second predetermined level is about equal to two times the absolute value of the maximum negative incremental lamp impedance.

5. The electronic dimming ballast of claim 1, wherein the second predetermined level is about equal to the absolute value of the maximum negative incremental lamp impedance.

6. The electronic dimming ballast of claim 1, wherein the control circuit comprises an oscillator comprising a frequency-determining resistor-capacitor (RC) network for determining said frequency of operation.

7. The electronic dimming ballast of claim 6, wherein the RC network has component values such that the frequency of operation of the inverter is a function of the unloaded resonant frequency of the resonant tank circuit.

8. The electronic dimming ballast of claim 1, wherein the open loop system gain is reduced as the frequency of operation of said inverter deviates from the unloaded resonant frequency of the resonant tank circuit.

9. The electronic dimming ballast of claim 1, wherein the frequency of operation of said inverter is different from the unloaded resonant frequency of the resonant tank circuit such that the open loop system gain at about one percent nominal light output is approximately equal to the open loop system gain at about five percent nominal light output, and the ballast output impedance is greater than the absolute value of the maximum negative incremental impedance of the lamp.

10. A method for dimming a compact fluorescent lamp below about one percent nominal light output using an electronic dimming ballast of the type including a resonant tank circuit having an unloaded resonant frequency and a ballast output impedance, the fluorescent lamp having a negative incremental impedance, comprising:
   determining a predetermined maximum open loop system gain;
   determining a predetermined minimum ballast output impedance; and
   selecting a frequency of operation for the inverter such that the open loop systems gain is below about said predetermined maximum open loop system gain, and such that the ballast output impedance is above about said predetermined minimum ballast output impedance so as to operate said compact fluorescent lamp below about one percent nominal light output without observable flicker.

11. The method of claim 10, wherein the predetermined maximum open loop system gain is 15.

12. The method of claim 10, wherein the predetermined maximum open loop system gain is approximately equal to the open loop system gain at about five percent nominal light output.

13. The method of claim 10, wherein the predetermined minimum ballast output impedance is about equal to two times the absolute value of the maximum negative incremental lamp impedance.

14. The method of claim 10, wherein the predetermined minimum ballast output impedance is about equal to the absolute value of the maximum negative incremental lamp impedance.

15. The method of claim 10, wherein selecting a frequency of operation of said inverter comprises providing a control circuit having an oscillator with a frequency-determining resistor-capacitor (RC) network.

16. The method of claim 15, wherein the RC network has component values such that the frequency of operation of said inverter is a function of the unloaded resonant frequency of the resonant tank circuit.

17. The method of claim 10, wherein the open loop system gain is reduced as the frequency of operation of said inverter deviates from the unloaded resonant frequency of the resonant tank circuit.

18. The method of claim 10, wherein the frequency of operation of said inverter is different from the unloaded resonant frequency of the resonant tank circuit such that the open loop system gain at about one percent nominal light output is approximately equal to the open loop-system gain at about five percent nominal light output, and the ballast output impedance is greater than the absolute value of the maximum negative incremental lamp impedance.

* * * * *